United States Patent

Miller

(10) Patent No.: US 10,144,414 B2
(45) Date of Patent: Dec. 4, 2018

(54) ENGINE CONTROL FOR SMOOTH CLUTCH ENGAGEMENT IN A HYBRID VEHICLE

(71) Applicant: Ford Global Technologies, LLC, Dearborn, MI (US)

(72) Inventor: Kenneth James Miller, Canton, MI (US)

(73) Assignee: Ford Global Technologies, LLC, Dearborn, MI (US)

(\*) Notice: Subject to any disclaimer, the term of this patent is extended or adjusted under 35 U.S.C. 154(b) by 478 days.

(21) Appl. No.: 14/575,053

(22) Filed: Dec. 18, 2014

(65) Prior Publication Data

US 2016/0176393 A1 Jun. 23, 2016

(51) Int. Cl.

| B60W 20/40 | (2016.01) |
|---|---|
| B60W 10/06 | (2006.01) |
| B60W 10/08 | (2006.01) |
| B60W 10/02 | (2006.01) |
| B60K 6/387 | (2007.10) |
| B60K 6/547 | (2007.10) |
| B60K 6/48 | (2007.10) |

(52) U.S. Cl.
CPC ............ *B60W 20/40* (2013.01); *B60W 10/02* (2013.01); *B60W 10/06* (2013.01); *B60W 10/08* (2013.01); *B60K 6/387* (2013.01); *B60K 6/547* (2013.01); *B60K 2006/4825* (2013.01); *B60W 2710/0633* (2013.01); *B60W 2710/0666* (2013.01); *B60W 2710/0672* (2013.01); *Y02T 10/48* (2013.01); *Y02T 10/6252* (2013.01); *Y02T 10/6286* (2013.01)

(58) Field of Classification Search
CPC ...... B60W 20/40; B60W 10/08; B60W 10/02; B60W 10/06
See application file for complete search history.

(56) References Cited

U.S. PATENT DOCUMENTS

| 6,042,507 | A | * | 3/2000 | Genise | B60W 10/06 |
|---|---|---|---|---|---|
| | | | | | 477/174 |
| 7,998,024 | B2 | | 8/2011 | Silveri et al. | |
| 8,290,681 | B2 | | 10/2012 | Kaminsky et al. | |
| 8,412,426 | B2 | | 4/2013 | Sah | |
| 2002/0170758 | A1 | * | 11/2002 | Shimabukuro | B60K 6/48 |
| | | | | | 180/65.25 |
| 2011/0029208 | A1 | | 2/2011 | Xia | |
| 2012/0022751 | A1 | * | 1/2012 | Matsuda | F16H 63/50 |
| | | | | | 701/54 |
| 2013/0296104 | A1 | | 11/2013 | Nefcy | |
| 2013/0297105 | A1 | | 11/2013 | Yamazaki et al. | |
| 2013/0325238 | A1 | * | 12/2013 | Kato | B60W 10/06 |
| | | | | | 701/22 |

\* cited by examiner

*Primary Examiner* — Genna M Mott
(74) *Attorney, Agent, or Firm* — David B. Kelley; Brooks Kushman P.C.

(57) ABSTRACT

A vehicle includes an engine, a traction motor, a clutch configured to mechanically couple the engine and traction motor, and a controller. The controller may be configured to, in response to an engine starting and achieving a target speed while the traction motor is generating torque to drive the vehicle, retard engine spark, based on an amount of engine acceleration required to achieve the target speed, to reduce engine torque, and in response to the engine torque falling below a threshold value, lock the clutch.

17 Claims, 2 Drawing Sheets

ENGINE CONTROL FOR SMOOTH CLUTCH ENGAGEMENT IN A HYBRID VEHICLE

TECHNICAL FIELD

This disclosure relates to engine starts in hybrid electric vehicles.

BACKGROUND

A hybrid electric vehicle utilizes both an engine and an electric machine to provide torque to the wheels. A disconnect clutch may decouple the engine from the vehicle powertrain to allow the engine to be in an off state while the electric machine is propelling the vehicle.

SUMMARY

A vehicle control method is provided. The method may include, in response to an engine starting and achieving a target speed while an electric machine is generating torque to drive the vehicle, retarding engine spark to reduce engine torque. The method may further include, in response to the engine torque falling below a threshold value, locking a clutch configured to mechanically couple the engine and the electric machine.

A vehicle is provided. The vehicle includes an engine, a traction motor, a clutch configured to mechanically couple the engine and traction motor, and a controller. The controller may be configured to, in response to an engine starting and achieving a target speed while the traction motor is generating torque to drive the vehicle, retard engine spark, based on an amount of engine acceleration required to achieve the target speed, to reduce engine torque, and in response to the engine torque falling below a threshold value, lock the clutch.

A controller for a vehicle is provided. The controller may include input channels configured to receive engine status indicators, and output channels configured to provide engine operating commands and clutch engagement commands. The controller may further include control logic configured to, in response to engine status indicators indicative of an engine starting and achieving a target speed while an electric machine is generating torque to drive the vehicle, generate engine operating commands to retard engine spark to reduce engine torque, and in response to engine status indicators indicative of the engine torque falling below a threshold value, generate clutch engagement commands to mechanically couple the engine and electric machine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
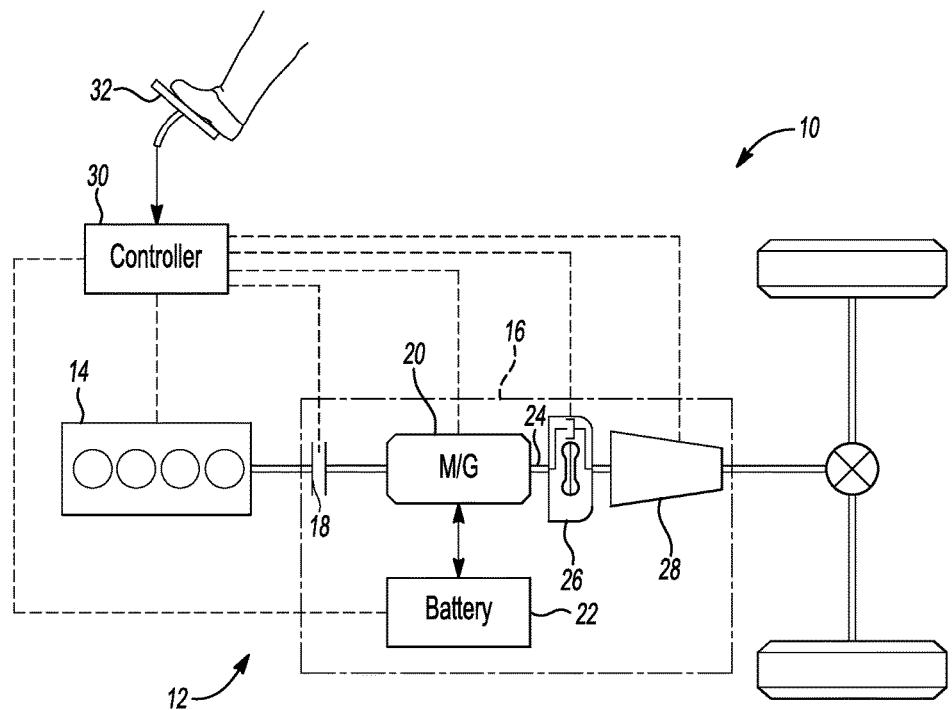
FIG. 1 is a schematic diagram of a hybrid electric vehicle.

Referring to FIG. 1, a schematic diagram of a Hybrid Electric Vehicle (HEV) 10 is illustrated according to an embodiment of the present disclosure. Physical placement and orientation of the components within the vehicle may vary. Although the powertrain of FIG. 1 will be particularly described, the strategies in accordance with embodiments of the present disclosure may apply to other powertrain configurations. The HEV 10 includes a powertrain 12 having an engine 14 that is operatively connected to a transmission 16. The transmission 16 may include a disconnect clutch 18, an electric machine such as an electric motor-generator 20, an associated traction battery 22, an input shaft 24, a launch clutch or torque converter 26, and a gear box 28.

The engine 14 may be selectively coupled to the motor-generator 20 via the disconnect clutch 18. The engine 14 and the motor-generator 20 may both act as drive sources for the HEV 10 by providing torque to the gearbox 28. The motor-generator 20 may be implemented by any one of a plurality of types of electric machines. For example, motor-generator 20 may be a permanent magnet synchronous motor.

A controller 30 may be in communication with the engine 14, the powertrain 12, and accelerator pedal 32. The controller 30 may be configured to operate the HEV 10 or powertrain 12 in a charge depletion mode in which the engine 14 may be isolated from the remainder of the powertrain 12, via the disconnect clutch 18, such that the motor-generator 20 may act as the sole drive source for the HEV 10 using the traction battery as its power source. The controller 30 may also be configured to operate the HEV 10 or powertrain 12 in a charge sustaining mode in which the engine 14 is operatively connected to the remainder of the powertrain 12, such that both the engine 14 and motor-generator 20 may act as drive sources for the HEV 10.

While illustrated as one controller, the controller 30 may be part of a larger control system and may be controlled by various other controllers throughout the HEV 10, such as a vehicle system controller (VSC). It should therefore be understood that the controller 30 and one or more other controllers can collectively be referred to as a "controller" that controls various actuators in response to signals from various sensors to control functions such as starting/stopping engine 14, operating motor-generator 20 to provide wheel torque or charge the fraction battery 22, selecting or scheduling transmission shifts, etc.

The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller 30 may communicate with various engine/vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, the controller 30 may communicate signals to and/or from engine 14, powertrain 12, and accelerator pedal 32. Although not explicitly illustrated, those of ordinary skill in the art will recognize various functions or components that may be controlled by the controller 30 within each of the subsystems identified above.

Representative examples of parameters, systems, and/or components that may be directly or indirectly actuated using control logic executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging, regenerative braking, electric machine operation, clutch pressures, and transmission, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), and deceleration or shift mode (MDE).

When the motor-generator 20 is providing drive torque to the gearbox 28, an operator of the HEV 10 may depress accelerator pedal 32. Depressing the accelerator pedal 32 is consistent with a tip-in event. A tip-in event increases the demand for drive torque from the motor-generator 20 to the gearbox 28. The increased drive torque demand may require starting the engine 14. Starting the engine 14 creates competing requirements. For example, the engine 14, upon restart, needs to achieve a rate of combustion to reach a speed consistent with a target speed of the vehicle, as well as allow the engine 14 to synchronize the motor-generator 20 through the gearbox 28. The engine 14 needs to reach a target speed to synchronize with the motor-generator 20. The target speed that allows for synchronization may be referred to as a synchronous speed. The engine 14 needs to reach this synchronous speed within a relatively short duration. The engine may reach the synchronous speed within 300 ms.

Reaching the synchronous speed quickly within a first time period, while still enabling a smooth clutch engagement, requires controlling the combustion within the engine 14. Increasing the air mass and spark timing within the engine 14 increases the torque the engine 14 produces. To increase the air mass an engine throttle (not shown) opens, and the intake and exhaust cams (not shown) adjust to allow more air and fuel into the engine 14. Allowing air and fuel into the engine aids to quickly increase the combustion pressures within the engine 14, and therefore aids to increase the amount of torque produced by the engine 14. However in order for the disconnect clutch 18 to lock to connect the engine 14 to the motor-generator 20, engine torque needs to be below a threshold. To get the actual engine torque below the threshold, the reduction in engine torque command needs to occur prior to the engine speed reaching the target speed. For example, the actual engine torque needs to reduce approximately 80 ms before the engine speed reaches the target speed because of engine/driveline response time. In order to maintain a smooth and synchronous disconnect clutch 18 engagement allowing the engine 14 to provide torque to the wheel, the engine torque must reduce, for example, to below 50 N·m.

In order to reduce engine torque below the requirement for smooth engagement, engine torque needs to be cut within a second time period. This time period, in one example, may be approximately 80 ms. That is the time beginning with the initiation of the reducing and ending with the torque falling below a threshold. After the disconnect clutch engages, the engine 14 needs to produce enough torque to satisfy the demand from the operator tip-in and propel the vehicle. Therefore, a method to enhance the speed and smoothness of an engine start and engagement may be advantageous.

In at least one embodiment, a method of controlling a vehicle may accelerate the engine 14 to the target speed within the first time period as well as reduce the engine torque within the second time period to provide a smooth engagement between the engine 14 and the motor-generator 20. As will be described in more detail below, combustion may be controlled in order to quickly allow the engine 14 to achieve a desired speed, as well as to reduce torque in order to lock the disconnect clutch 18.

Figure 2A:
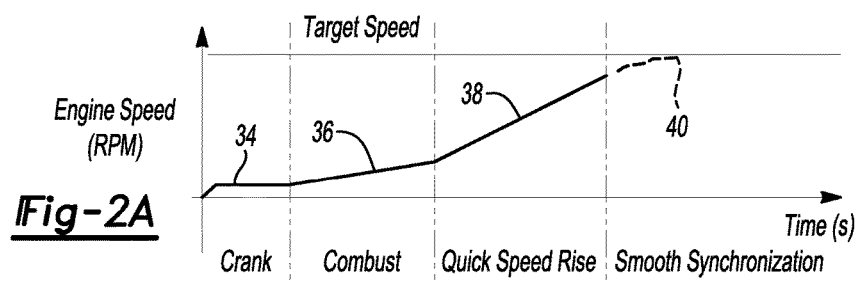
FIGS. 2A-2B are a series of graphs depicting the relationship between speed and torque during operation of a hybrid electric vehicle.
Figure 2B:
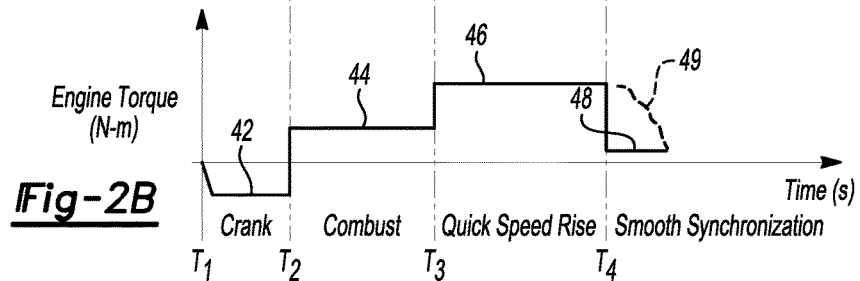

Referring to FIGS. 2A-2B, a series of graphs depict an engine speed and engine torque through a series of time intervals. Specifically, graph 2A depicts engine speed along the y-axis and time along the x-axis. Likewise, graph 2B depicts engine torque along the y-axis and time along the x-axis. Time, along the x-axis, is segmented through four engine operations. The first time period, T1, is consistent with the first crank of the engine upon an engine start. The second time period, T2, is consistent with the first combustion event of the engine after the crank of the engine. The third time period, T3, is consistent with the speed rise, or rate of speed of the engine acceleration. The fourth time period, T4, is consistent with engagement of the disconnect clutch 18 and synchronization of the engine 14 with the motor-generator 20.

FIG. 2A depicts the engine speed rise necessary to match a target speed of the vehicle 10. At T1, an operator of the vehicle 10 may tip in requiring the engine 14 to start. When the engine 14 starts, at T1, the engine 14 crank provides an initial increase in speed, represented by 34. At T2, the engine 14 combusts. As stated above, combustion within the engine 14 causes an increase in the rate of speed, or acceleration of the engine 14. The rate of engine speed may increase gradually as shown through slope 36.

At T3, the acceleration of the engine 14 sharply increases. The rate of increase, as represented by 38, depends on the target speed. The engine 14 may, based on an inertial torque calculation, achieve a change in rpm within a change in time of a first time period. For example, the engine 14 may be commanded to provide enough combustion to get within 100 rpm of the target speed within 0.2 s. As will be described in more detail below, in order to achieve acceleration necessary to reach the target speed, the engine 14 increases spark and air mass. Increasing spark and air mass within the engine 14 increases torque provided by the engine 14.

At T4, the disconnect clutch 18 may engage, linking the engine 14 to the motor-generator 20. A point of synchronization 40 between the engine speed and the target speed may be predicted based on the engine speed rate. This allows for calculation of a second time period indicative of synchronization of the engine speed and the target speed at 40.

FIG. 2B depicts an engine torque necessary to allow acceleration of the engine in order to match the target speed as well as provide a smooth synchronization between the engine 14 and the motor-generator 20. As stated above, T1 is consistent with an operator tipping-in and starting the engine 14. In order to provide engine torque, the engine 14 cranks. Initially, cranking the engine 14 may produce a negative torque 42 before combustion occurs. Therefore, the engine 14 may maintain the negative torque 42 through time T1. However at time T2, engine combustion occurs.

The engine 14 produces positive torque 44 during combustion via opening the throttle and adjusting the variable valve timing. The positive torque 44 may depend on the amount of spark and air mass allowed to combust within the engine 14. The engine 14 produces an initial torque at 44 as a result of initial combustion at time T2. As the engine 14 enters time T3 much more spark and air mass may be needed to provide enough combustion within the engine 14 to achieve an increase in torque at 46 to synchronize the engine speed with the target speed in the desired period of time. This torque may be referred to as the inertial torque. The inertial torque output at 46 may be too much torque to allow the disconnect clutch 18 to lock.

At T4, the engine torque needs to be near zero at the synchronization speed. The engine torque must be below 50 N·m, for example, at the synchronization speed in order for the disconnect clutch 18 to lock. As stated above, the synchronization time may be based on the engine speed rate. The synchronization time may also be based on the torque response within the engine 14. The calculation of the second time period may be used as a determination of when to cut engine torque. Cutting engine torque at 48 at the second time period may be based on the amount of spark within the engine 14. Therefore, spark within the engine 14 may be retarded within the second time period. As will be discussed in more detail below, clipping air mass may also be used to reduce engine torque at 48.

FIG. 2B shows the engine torque as a step function at 48. This represents the negative torque imposed by retarding engine spark and/or clipping air mass. However, the actual response of the imposition of the commanded negative torque on the engine may result in a more gradual reduction of actual engine torque at 49. The actual torque response of the engine 14 is therefore more gradual than commanded engine torque. At low speed, the torque response of the engine 14 may be 100 ms. This may result in retarding engine spark at an engine acceleration of 100 rpm below the target speed. Using the actual torque response of the engine 14 and the acceleration of the engine 14 allows for the necessary reduction, by retarding engine spark, of engine torque within the second time period.

Figure 3:
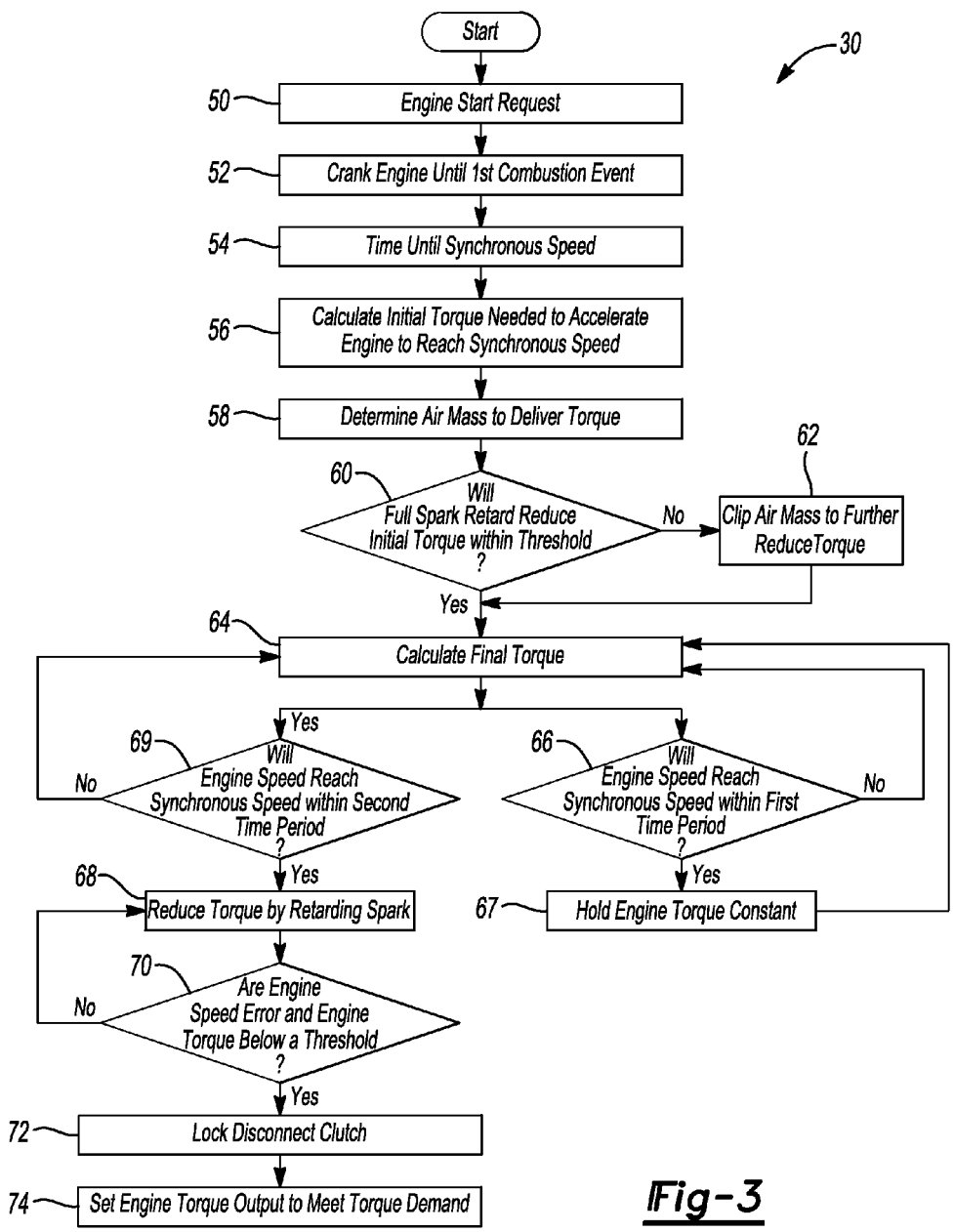
FIG. 3 is a flow chart describing control logic for a vehicle controller of a hybrid electric vehicle.

Referring to FIG. 3, a control logic flow diagram depicting control logic to rapidly accelerate the engine 14 and provide a smooth synchronization between the engine 14 and motor-generator 20 is provided. As stated above, the controller 30 may communicate with the engine 14 and engine components in order to implement the control logic described below. At 50, the controller 30 may receive a request to start the engine 14. Requesting an engine start may be consistent with a tip in event described above. At 52, the controller may command the engine 14 to crank until a first instance of combustion within the engine 14. Cranking the engine 14 and the subsequent first instance of combustion within the engine 14 may be consistent with standard engine starting operations.

At 54, the controller 30 may determine a target speed and calculate a first time period for the engine 14 to reach a synchronous speed with the target speed. At 56, the controller 30 uses the first time period at 54 and the required engine speed change to calculate an initial engine torque. The initial engine torque is the torque needed to accelerate the engine within the first time period to reach the synchronous speed. To find the initial torque value at 56 the rotational inertia of the engine 14 and the change in speed after the first instance of combustion at 52 may be divided by the first time period. At 58, the controller 30 may calculate an amount of air mass and spark necessary to increase combustion within the engine 14 in order to deliver the initial torque value.

The initial torque value may be above a threshold torque value. When the initial torque value is above the threshold value, the disconnect clutch 18 may not lock. Synchronization of the disconnect clutch 18 at a high torque value above the threshold may result in disturbances felt by the operator along the powertrain 12. These disturbances may include a disruption felt on the driveline as well as potential damage to powertrain components. Therefore in order to provide a smooth synchronization after calculating the initial torque value at 56 to achieve the engine speed rise necessary to match the target speed, the controller 30 may determine at 60 how to achieve the negative torque value in order to reduce the initial torque value. In at least one embodiment, the controller 30 may calculate at 60 if fully retarding engine spark will reduce the initial torque value within the threshold.

If at 60, the controller 30 determines that fully retarding engine spark will not reduce the initial torque value within the threshold, the controller 30 may also at 62 clip the air mass allowed into the engine 14 during combustion. Clipping the air mass after the start may allow the controller 30 to command a sufficient reduction in torque from the engine 14 to reduce the initial torque value to be within the threshold when the synchronous speed is reached.

If at 60, the controller 30 determines that fully retarding engine spark will reduce the initial torque value within the threshold, the controller 30 may at 64 determine a final torque value. The final torque value is a reduction of the initial torque value by the anticipated negative torque generated by retarding engine spark. The controller 30 calculates the final torque value to ensure the engine torque will be within the threshold within the second time period. Calculating the final torque value allows the controller 30 to accurately determine the engine torque at the second time period to ensure engagement of the disconnect clutch 18.

The final torque value may also be a reduction of the initial torque through generation of negative torque by clipping air mass at 62. For example, the controller 30 may at 60 determine whether clipping air mass may deliver enough negative torque to reduce the initial torque value within the threshold. Likewise, the controller 30 may determine at 62 if retarding engine spark is necessary to further reduce the initial torque value to achieve the final torque value within the threshold.

At 66, engine acceleration may be such that the engine speed reaches the target speed within a first time period. As stated above, the first time period may be less than 300 ms. If at 66, the controller 30 determines the engine acceleration will not allow the engine speed to match the target speed within the threshold time; the controller 30 may recalculate the final torque value at 64. If at 66, the controller 30 determines engine acceleration will allow the engine speed to match the target speed within threshold time, the engine torque may be held at a constant rate at 67.

At 69, the controller 30 determines whether the acceleration of the engine 14 will cause the engine speed to reach the target speed within a response time of the powertrain driveline, e.g. 80 msecs. The response time of the powertrain driveline may be consistent with the second time period. The calculations of the first time period at 66 and the second time period at 69 may be simultaneous. If at 69 the engine speed, calculated from the engine acceleration, will not reach the target speed within the response time of the powertrain driveline, the controller 30 may recalculate the final torque at 64.

If at 69 the controller 30 calculates the engine speed will reach the target speed within the response time of the powertrain driveline, the controller 30 may command the engine 14 to reduce at 68 the initial torque value consistent with the engine spark retard calculation at 60. Reducing the initial torque value consistent with the engine spark retard calculation at 60 commands the engine 14 to achieve the final torque value at 64 by reducing engine spark at 68. Likewise, as stated above, the final torque value may also be reduced by clipping air mass at 62. Therefore, achieving the final torque value calculated at 64 may also allow the controller 30 to command the engine 14 to reduce torque by clipping air mass.

The controller 30 at 70 may verify an engine speed error and an engine torque as being below a threshold. If the engine speed error and engine torque are above a threshold at 70, then the controller 30 may further reduce a final torque value at 64 by further retarding engine spark or clipping air mass at 68. If however the engine speed error and engine torque are below a threshold at 70 then the controller 30 may command locking the disconnect clutch 18 at 72. Instantaneously reducing the final torque value at 64 and producing a reduction in torque to a quantity near zero, e.g. −50 to +50 nm by retarding engine spark at 68 may allow for a smooth and timely clutch engagement at 72. The threshold value of the engine speed error may be 50 rpm. If the engine speed error is below the threshold value, then the engine speed and the target speed are synchronized. If the engine speed and the target speed are synchronous, the controller 30 may lock the disconnect clutch 18 at 72 engaging the engine 14 and the motor-generator 20.

Locking the disconnect clutch 18 to engage the engine 14 and the motor generator 20 may allow an engine output torque through the powertrain 12 of the vehicle 10. The engine torque output may be used to propel the vehicle. At 74, the controller 30 may set the engine torque output value to meet an operator demand. The engine torque output value may be consistent with the demanded torque from a tipping-in event as described above. When the controller 30 sets the engine torque output at the torque demand of the operator, the engine 14 will provide torque through the powertrain 12 of the vehicle 10. As stated above, the engine 14 may provide the sole motive power of the vehicle 10. Likewise, the engine 14 may provide motive power with the motor-generator 20 to propel the vehicle 10.

Further, using the control method of the present disclosure minimizes overshoot of the engine 14. Using the initial torque value at 56 to accelerate the engine 14 and retarding engine spark at 68 to achieve the final torque value provides a more accurate control method for an engine start. This reduces the need for the controller 30 to compensate for engine overshoot and provides more efficient operation of the engine 14. Accelerating the engine 14 to allow the engine speed to match a target speed and maintaining a smooth engagement between the engine 14 and the motor generator 20 through the disconnect clutch 18 may improve the overall efficiency of the vehicle 10. Improving the overall efficiency of the vehicle 10 while minimizing powertrain disturbances increases the overall vehicle quality. Minimizing powertrain disturbances provides for smooth operation and improved drivability of the vehicle 10. Likewise, achieving a faster time from engine crank to clutch engagement, improves the powertrain response time, which improves acceleration pedal response time.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A vehicle control method comprising:
   in response to an engine starting and achieving a target speed while an electric machine is generating torque to drive the vehicle, retarding engine spark to reduce engine torque; and
   in response to the engine torque falling below a threshold value, locking a clutch configured to mechanically couple the engine and the electric machine.

2. The method of claim 1, wherein an amount of the retarding is based on an engine torque required to achieve the target speed.

3. The method of claim 2, wherein the engine torque required to achieve the target speed is based on a pre-defined time period.

4. The method of claim 3, wherein a time period beginning with initiation of the retarding and ending with the engine torque falling below the threshold value is less than the pre-defined time period.

5. The method of claim 4, wherein the pre-defined time period is equal to 300 ms and the time period is equal to 80 ms.

6. The method of claim 1, further comprising, in response to the engine starting and achieving the target speed while the electric machine is generating torque to drive the vehicle, clipping engine air mass to reduce the engine torque.

7. A vehicle comprising:
   an engine;

a traction motor;

a clutch configured to mechanically couple the engine and traction motor; and a controller configured to, in response to the engine starting and achieving a target speed while the traction motor is generating torque to drive the vehicle, retard engine spark, based on an amount of engine acceleration required to achieve the target speed, to reduce engine torque, and in response to the engine torque falling below a threshold value, lock the clutch.

8. The vehicle of claim 7, wherein the amount of engine acceleration required to achieve the target speed is based on a pre-defined time period.

9. The vehicle of claim 8 wherein a time period beginning with initiation of the reduction of engine torque and ending with the engine torque falling below the threshold value is less than the pre-defined time period.

10. The vehicle of claim 9, wherein the pre-defined time period is equal to 300 ms and the time period beginning with initiation of the reduction of engine torque and ending with the engine torque falling below the threshold value is equal to 80 ms.

11. The vehicle of claim 7, further comprising, in response to the engine starting and achieving the target speed while the traction motor is generating torque to drive the vehicle, clipping engine air mass to reduce the engine torque.

12. A controller for a vehicle comprising:

input channels configured to receive engine status indicators;

output channels configured to provide engine operating commands and clutch engagement commands; and control logic configured to, in response to engine status indicators indicative of an engine starting and achieving a target speed while an electric machine is generating torque to drive the vehicle, generate engine operating commands to retard engine spark to reduce engine torque, and in response to engine status indicators indicative of the engine torque falling below a threshold value, generate clutch engagement commands to mechanically couple the engine and electric machine.

13. The controller of claim 12, wherein an amount of the retarding is based on an engine torque required to achieve the target speed.

14. The controller of claim 13, wherein the engine torque required to achieve the target speed is based on a pre-defined time period.

15. The controller of claim 14, wherein a time period beginning with initiation of the retarding and ending with the engine torque falling below the threshold value is less than the pre-defined time period.

16. The controller of claim 15, wherein the pre-defined time period is equal to 300 ms and the time period beginning with initiation of the retarding and ending with the engine torque falling below the threshold value is equal to 80 ms.

17. The controller of claim 13, further comprising, in response to engine status indicators indicative of the engine starting and achieving the target speed while the electric machine is generating torque to drive the vehicle, clipping engine air mass to reduce the engine torque.

* * * * *